(No Model.)
J. B. ROGERS & W. H. HALL.
TIRE FOR VELOCIPEDES OR OTHER VEHICLES.
No. 592,125. Patented Oct. 19, 1897.
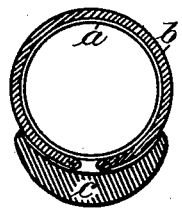
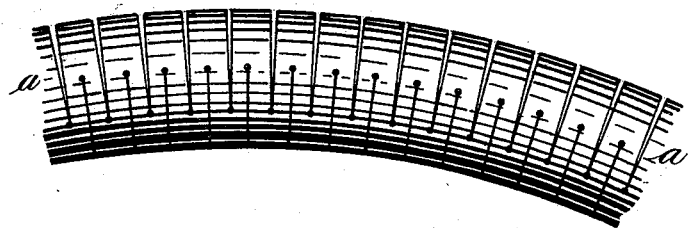

UNITED STATES PATENT OFFICE.

JOHN B. ROGERS AND WILLIAM HAM. HALL, OF SAN FRANCISCO, CALIFORNIA.

TIRE FOR VELOCIPEDES OR OTHER VEHICLES.

SPECIFICATION forming part of Letters Patent No. 592,125, dated October 19, 1897.

Application filed June 25, 1896. Serial No. 596,960. (No model.)

*To all whom it may concern:*

Be it known that we, JOHN B. ROGERS and WILLIAM HAM. HALL, citizens of the United States, residing in the city and county of San Francisco, State of California, have invented certain new and useful Improvements in Tires, of which the following is a specification.

Our invention relates to the class of spring or cushion tires adapted for use on velocipedes or other vehicles; and it consists of a spring metallic inner tire or cushion of suitable design and strength and an outer cover composed of rubber, or other suitable material, to provide a friction-surface, preserve the metallic inner tire, and keep the same free from dirt.

The object of our invention is to provide a flexible metallic tire for velocipedes and other vehicles (to answer the objects and fulfil the requirements of the pneumatic tire now in general use) forming a non-collapsible elastic cushion of simple and cheap design, of minimum weight, and great strength and durability, adapted to be easily adjusted to and removed from the felly of a wheel.

In the accompanying drawings, Figure 1 shows in section our improved tire, and Fig. 2 shows an elevation thereof.

Like letters of reference refer to corresponding parts in both the figures.

Our invention, as shown in the drawings, consists of an inner spring metallic tire or cushion $a$ in form of a circular tube of thin spring metal. This tube is cut transversely alternately from its inner and outer peripheries, forming two series of independent springs. The outer series forms the cushion and the inner series permits the tire to be adjusted to a grooved felly $c$ of larger diameter than the inner diameter of the tire, inasmuch as this inner series of springs may be flattened out in forcing the tire over the edge of a felly into the groove, but will assume their normal circular form when the tire is finally in place. An outer tire or cover $b$, composed of rubber or other suitable material, incases the inner tire $a$ and may completely encircle the same, or may be of form as shown in Fig. 1.

This tire may be adjusted to the fellies of bicycles now in general use without change thereof. It is particularly adapted to bicycles, but may be used to great advantage upon other vehicles. It possesses advantages over pneumatic tires in strength and durability and will completely do away with the annoyance and inconvenience caused by rupture or puncture of the latter. The slots being cut in the tire $a$ alternately from its inner and outer peripheries, they may extend past each other without dividing the tire into separate sections, thus combining great strength and flexibility.

This tire when made complete with the cover $b$ sprung upon a grooved felly will be held there to a great extent by the action of the inner series of springs of the cushion $a$, but it is designed so that the cover $b$ may be cemented firmly to the felly $c$.

What we claim as our invention, and desire protected by Letters Patent, is—

1. A cushion-tire consisting of a spring metallic tube alternately slotted from its inner and outer peripheries, substantially as described.

2. A cushion-tire composed of a spring metallic tube alternately slotted from its inner and outer peripheries, in combination with an outer cover incasing the same, substantially as described.

3. A cushion-tire composed of a spring metallic tubular band, alternately slotted from its inner and outer peripheries, substantially as described.

4. A cushion-tire composed of a spring metallic tubular band, alternately slotted from its inner and outer peripheries, in combination with an outer cover incasing the same, substantially as described.

May 14, 1896.

JOHN B. ROGERS.
WM. HAM. HALL.

Witnesses:
K. F. HALL,
WM. M. FITZHUGH,
N. E. W. SMITH.